May 16, 1933.                C. KNOBLOCH                1,909,545
                           LIQUID LEVEL GAUGE
                          Filed Oct. 19, 1929
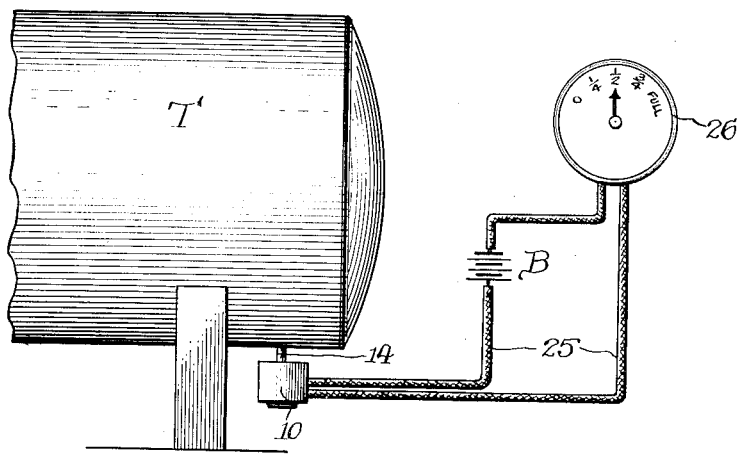
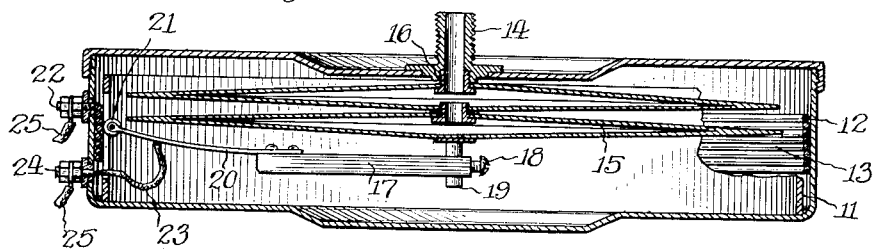
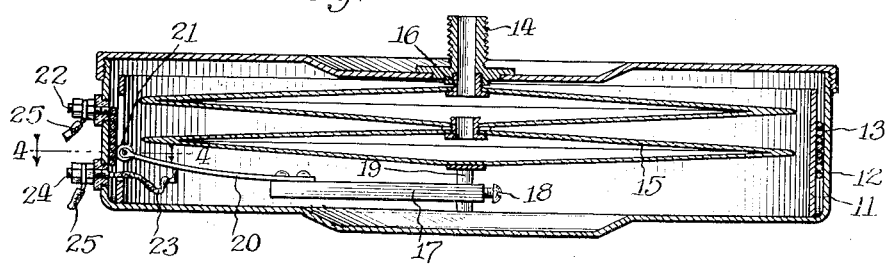
Inventor:
Carl Knobloch,
By Fisher Clapp, Soans + Pond, Attys.

Patented May 16, 1933

1,909,545

UNITED STATES PATENT OFFICE

CARL KNOBLOCH, OF AKRON, OHIO

LIQUID LEVEL GAUGE

Application filed October 19, 1929. Serial No. 400,759.

This invention relates to gauges for liquid tanks to indicate the quantity of liquid therein, and has reference more particularly to gauges of the electric type.

The general purpose or object of the invention is to provide a simple and effective electrical device for this purpose, actuated by the hydrostatic head of the liquid in the tank, and more particularly to provide an attachment for the bottom of the tank, including a pressure-responsive diaphragm construction upon which the liquid in the tank operates, and a variable resistance directly operated by said diaphragm and arranged in circuit with a suitable meter calibrated to indicate the quantity of liquid in the tank, which meter can be located at a remote point, the device being adapted to the use of several meters at various points, if required.

The foregoing and other objects of the invention are attained in the device illustrated in the accompanying drawing and described below; although it is to be understood that the invention is not limited to the specific form thereof shown and described.

Referring to the drawing—

Fig. 1 is a diagrammatic view showing in elevation a liquid-containing tank and my improved liquid level gauge applied thereto and electrically connected to a remote indicating meter.

Fig. 2 is an enlarged vertical axial section of the diaphragm box and diaphragm, showing the diaphragm in nearly collapsed position.

Fig. 3 is a view similar to Fig. 2, showing the diaphragm in fully expanded position.

Fig. 4 is an enlarged sectional detail on the line 4—4 of Fig. 3.

Referring to the drawing, 10 designates as an entirety a double-walled box, the inner and outer walls 11 and 12 of which are spaced to receive an insulated resistance coil or rheostat designated by 13. Attached to the top wall of the box is a threaded nipple 14 which, as shown in Fig. 1, may be screwed into the bottom wall of a liquid-containing tank T. Housed within the box 10 is a pressure-responsive self-contracting bellows diaphragm 15, the upper fold of which is connected by a nipple 16 to the lower end of the nipple 14 so that liquid in the tank T may flow freely through the registering nipples 14 and 16 into the interior of the diaphragm and expand the latter by the weight of the liquid. The bore of the nipple 14 preferably is comparatively small, so that the diaphragm will not be appreciably affected by agitation of the liquid in the tank, such as occurs in automobile fuel tanks.

An arm 17 is adjustably mounted by a set screw 18 on a stud 19 secured to and depending from the bottom fold of the diaphragm, the arm 17 being of non-conducting material. Attached to the outer end of the arm 17 is a metal contact arm 20, the free end of which preferably carries a roller 21. The inner wall 11 of the box is cut away opposite the end of the arm 20, exposing the resistance coil, and the insulation of the wire of the coil is also removed at this point, so that the roller 21 plays over and crosswise of exposed portions of the coil, as clearly shown in Fig. 4. The upper end of the resistance coil is electrically connected to an insulated binding post 22 mounted in the outer wall of the box, and the contact arm 20 is connected by a wire 23 to a lower binding post 24 also mounted in and insulated from the wall of the box. To the two binding posts 22 and 24 is connected a circuit lead wire 25, in which latter is included a source of electrical current, such as a battery B and a meter 26, the pointer of which responsive to variations in the current flowing through the circuit line 25.

In the operation of the device, current flows from one side of the battery through wire 25, binding post 24, wire 23, arm 20 and its roller 21, the portion of the resistance coil above the roller 21, binding post 22, and wire 25 back to the other side of the battery. The meter is actuated by variations in the current, these variations depending upon the amount of the rheostat or resistance coil included in the circuit. When the tank is full, the diaphragm is fully expanded, and substantially the entire resistance coil is thrown into the circuit. This causes the meter to indicate "full". As the level in the tank falls, the hydrostatic head of the liquid decreases, and the bellows diaphragm contracts more or less, thus cutting out some of the resistance and causing the meter pointer to travel toward the "0" mark. Where the device is used as an automobile gasoline gauge, the flow passage from the tank into the diaphragm is so small that the diaphragm is substantially unaffected by the jolting and agitation of the liquid in the tank, and the movement of the indicator pointer is steady.

From the foregoing it will be seen that my invention provides a very simple, direct-acting gauge, in which inaccuracies, due to lost motion between mechanical parts, are avoided, and indication of the quantity of liquid at remote points is effectively accomplished. Modifications of the invention may be resorted to within the scope of the appended claims, without departing from the spirit thereof.

I claim:

1. A liquid tank gauge, including a box having a nipple thereon for threading into an aperture in the bottom of a tank, a self-contracting bellows diaphragm in the box operable by pressure of the liquid in the tank through the nipple, the bore of the nipple being sufficiently small to prevent appreciable response of the diaphragm to agitation of the liquid in the tank, a resistance coil encircling said diaphragm within said box, and a contact member directly mounted on said diaphragm and riding on and crosswise of said coil.

2. A liquid tank gauge, comprising a box formed with spaced outer and inner walls, said inner wall having a slot, a self-contracting bellows diaphragm housed in said box and adapted for connection to a tank, a resistance coil mounted in the said box between said outer and inner walls, and a contact arm attached to and insulated from the bottom member of said diaphragm and movable with the latter, the free end of said contact arm extending through the slot of said inner wall and movable across said resistance coil.

3. A liquid tank gauge apparatus including a box having a nipple thereon for threading into an aperture in the bottom of the tank, a pressure responsive diaphragm construction in the box operable by the pressure of the liquid in the tank through the nipple, a variable resistance contact element directly mounted on the diaphragm construction, and a variable resistance coil wound about the box, said contact riding on said coil.

CARL KNOBLOCH.